United States Patent [19]

Schultz et al.

[11] Patent Number: 4,924,926
[45] Date of Patent: May 15, 1990

[54] CENTRAL TIRE INFLATION SYSTEM

[75] Inventors: Gary R. Schultz, Kalamazoo, Mich.; Jerry M. Oltean, Windsor, Canada

[73] Assignee: Eaton Corporation, Cleveland, Ohio

[21] Appl. No.: 232,262

[22] Filed: Aug. 15, 1988

[51] Int. Cl.⁵ .............................................. B60C 23/10
[52] U.S. Cl. .................................. 152/417; 152/415; 137/625.2
[58] Field of Search ............... 152/415, 416, 417, 427; 137/226, 224, 625.2

[56] References Cited

U.S. PATENT DOCUMENTS 3,175,581  3/1965  Brandenberg et al. ......... 137/596.15
4,640,331  2/1987  Bruan ............................... 152/417

Primary Examiner—Robert A. Dawson
Assistant Examiner—Gregory J. Wilber
Attorney, Agent, or Firm—P. S. Rulon

[57] ABSTRACT

An air circuit for a central tire inflation system having a relief valve (158) in the air circuit to provide the necessary pressure drop for deflation and having make up air from a source (S) bleed into the air circuit via one of two normally closed solenoid actuated valves (164, 174). The make up air is connected via a small orifice (214) when a solenoid (192) associated with a deflate valve (164) or a shut off valve (174) is energized.

5 Claims, 4 Drawing Sheets

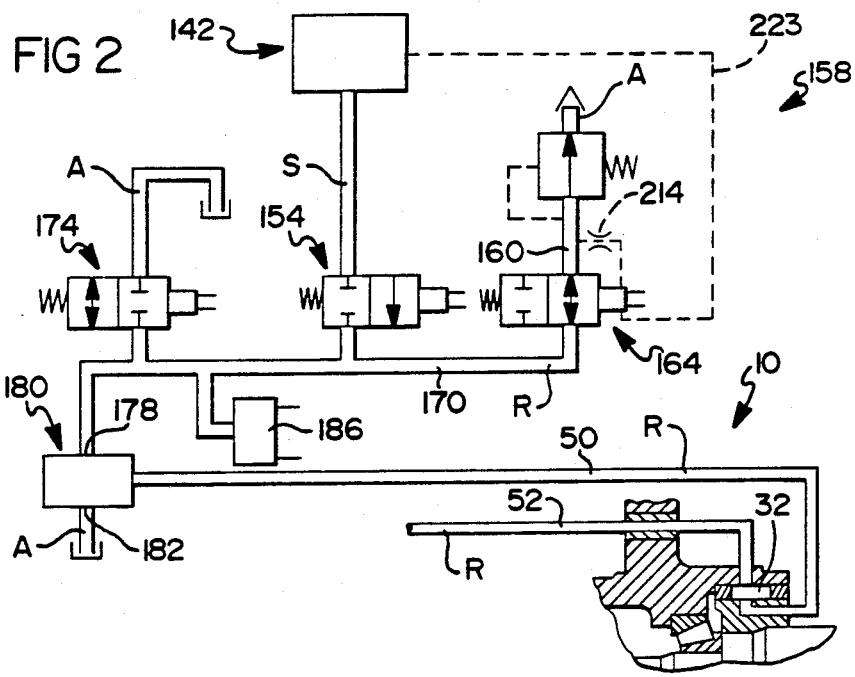
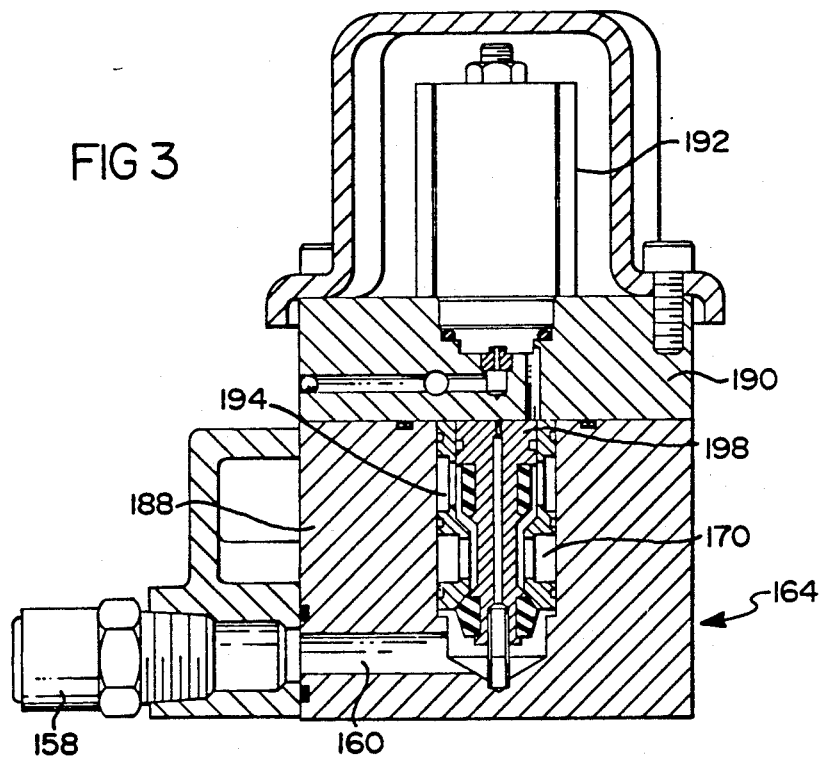

CENTRAL TIRE INFLATION SYSTEM

This invention relates to a vehicular central tire inflation system (CTIS), also know as tire pressure regulating systems, wherein the inflation pressure of vehicle tires may be controlled from a remote location (usually the vehicle cab with the vehicle at rest and/or in motion and utilizing an on board source of pressurized air).

More particularly this invention relates to CTIS for a vehicle as may be seen by reference to U.S. Pat. No. 4,640,331, hereby incorporated by reference, which utilizes a control valve and a low tire pressure shut off valve at each wheel end assembly which are connected to a central control system by a single pressure line or conduit through a rotary seal assembly. Pressurization of the single pressure conduit is effective to open and close communication to the vehicle tire and to cause inflation and/or deflation of the tire to a selected pressure. While the above CTIS has been satisfactorily employed, it is controlled during deflation by a pressure regulator which inaccurately controls deflating pressure.

Accordingly it is an object of the present invention to provide an improved central tire inflation system with a relief valve in the air circuit which provides the necessary pressure drop for deflation and also to provide make up air to accommodate minor line and fitting leaks by feeding make up air into the air circuit either during deflation of the tire or immediately thereafter via one of two solenoid valves in the air circuit.

This and other objects and advantages of the present invention will become apparent from a reading of the following description of the preferred embodiments taken in connection with the attached drawings.

FIG. 2 is a schematic illustration of the pneumatic components of the present invention during the tire deflation mode of operation.

FIG. 3 is a cross-sectional view of the tire deflate valve schematically illustrated in FIG. 2.

Figure 1:
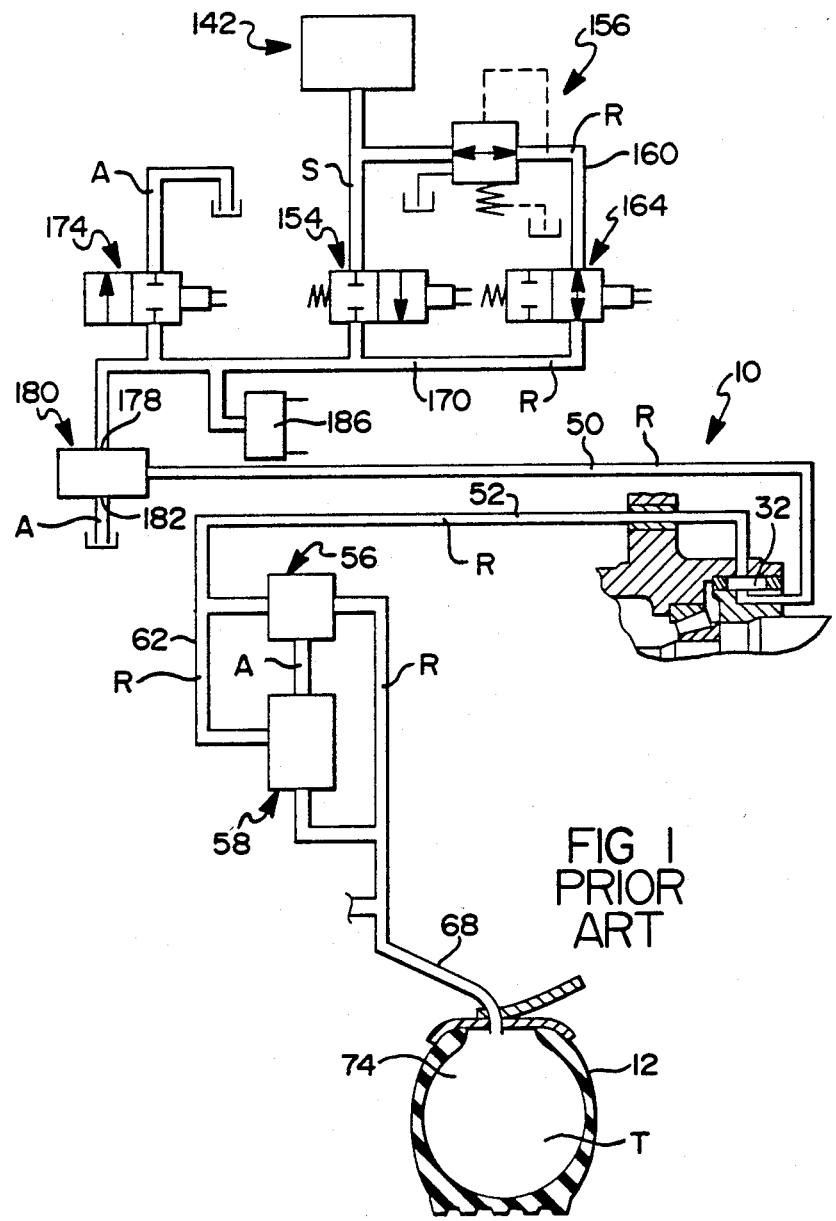
FIG. 1 is a schematic illustration of the pneumatic components of the prior art during the tire deflation mode of operation.

In FIG. 1 and FIG. 2 of the drawings the pressurization of the various conduits and/or chambers is indicated by a "S" for supply pressure receiving air from a supply 142 at pressure greater than or equal to the maximum tire pressure for the vehicle tires, "R" for regulated pressure (8 to 10 psi), "A" for atmospheric pressure and "T" for tire pressure.

FIG. 1 is a schematic illustration of the pneumatic components of the central tire inflation system disclosed in U.S. Pat. No. 4,640,331 during a tire deflate mode of operation. Prior to the deflate mode of operation, conduits 50 and 170 are at substantially the same pressure as in the chamber 74 of the tire 12. Also, the solenoid inflate valve 154, the solenoid deflate valve 164, and the solenoid shut-off valve 174 are closed. Upon actuation of solenoid deflate valve 164, regulated pressure, such as 10 psi, for the pressure regulator 156, will be present in conduits 160 and 170 and at port 178 of the quick release valve 180, causing the conduits 50, 52, 62 and 68, and tire chamber 74 to quickly bleed down toward the regulated pressure through exhaust port 182 of quick release valve 180. After a period of time, the deflate valve 164 will be closed and the inflate valve 154 will be momentarily actuated thereby communicating the source of air S with conduit 170. This action causes quick release valve 180 to again balance the pressures in conduits 50 and 170, allowing pressure to be measured via pressure transducer 186 to determine if further deflation and/or inflation is required. At the end of the deflation operation, shut off valve 174 will open, closing wheel valve 58. It is important to note that the pressure in conduit 170 and thus in port 178 on the quick release valve 180 will cause the quick release valve 180 to close and prevent further venting of the tire below the predetermined regulated pressure.

It has been determined that the system as described above will on occasion malfunction due to the nature of regulator 156 as a device which regulates at a different pressure if flow thru it is reversed. In accordance with this invention, the pressure regulator 156 is deleted from the circuit and a relief valve 158 substituted therefor as shown in FIG. 2 of the drawings. Thus, during deflation the pressurized air in line 170 passes through the deflate valve 164 towards the relief valve 158 which functions to release air to atmosphere so long as the pressure in lines or conduits 170, and 50, is above the low pressure setting of the relief valve 158. Additionally, the deflate circuit is provided with an orifice which feeds make-up pressurized air into line or conduit 170 to compensate for leaks in the air circuit due to minor fitting leaks and the like.

Figure 4:
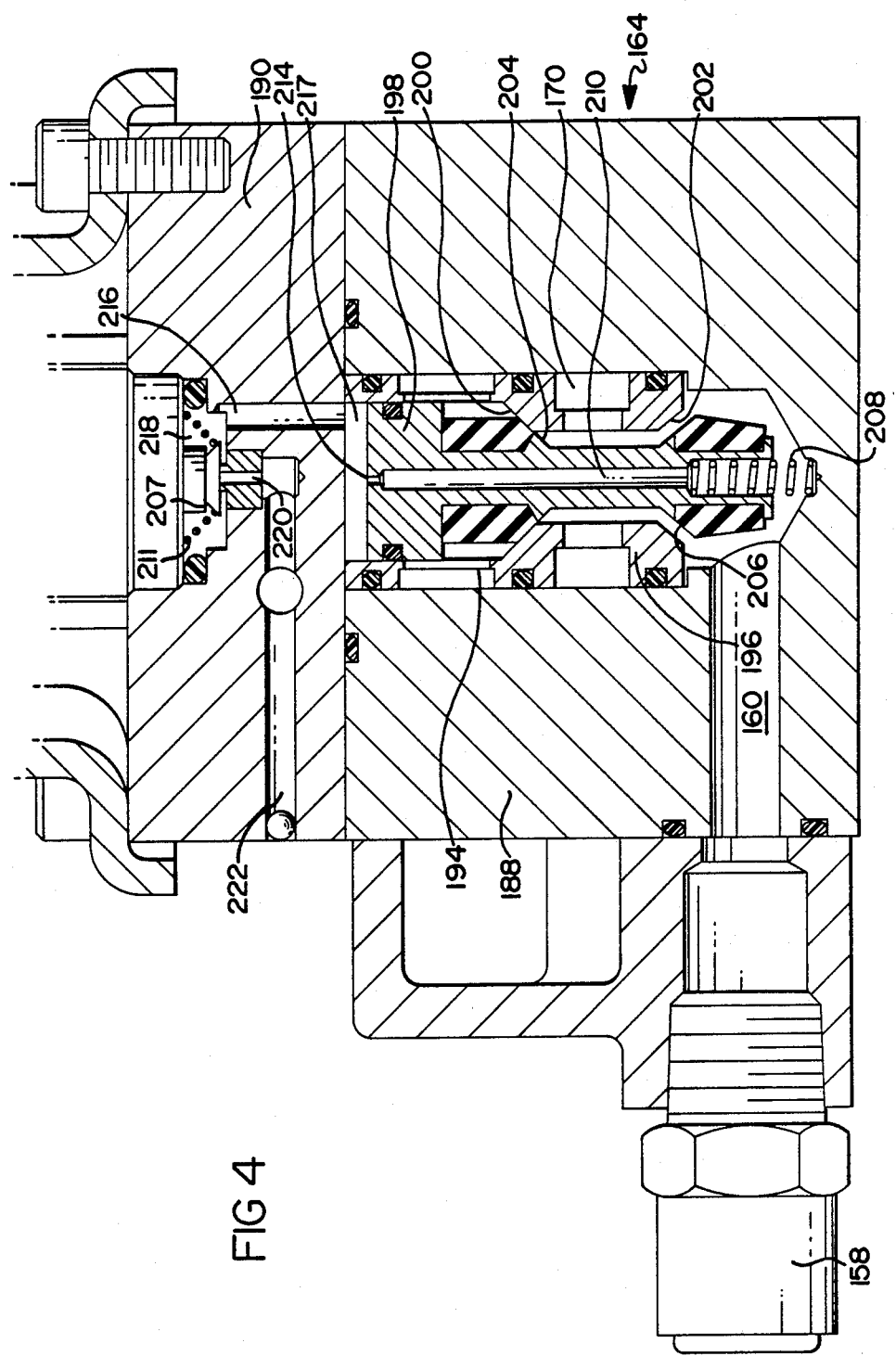
FIG. 4 is an enlarged partial cross-sectional view of the tire deflate valve shown in FIG. 3.

In FIGS. 3, and 4 the deflate valve 164 includes a valve body 188, a top-plate 190 and an actuating solenoid operator 192 mounted thereon. A blind hole is formed in the body 188 in which is positioned a valve cartridge 194 having an outer tubular or cylindrical member 196 and a poppet element 198. The inner bore of the cylindrical member 196 is provided with spaced annular beveled valve seats 200 and 202 against which the conical seats 204 and 206 of the poppet element 198 are seated respectively. When the solenoid operator 192 is de-energized, the conical seat 206 is sealed against the valve seat 202 by the spring 208 so that pressurized air is prevented from flowing into the conduit 160 from conduit 170, which extends into the area between valve seats 200 and 202 via unshown passage. When the solenoid operator 192 is energized, valve member 207 is moved away from the seat 220 against the bias of spring 211 so that pressurized air from conduit 222 flows through the hole in seat 220, into the space 218, and hence through the conduit 216, thereby pressurizing the space 217 above the poppet element 198 and moving the element 198 downwardly into the position shown in FIG. 4. Thus, the conical seat 206 is opened and the conical seat 204 is sealed against the valve seat 200 and pressurized air may move from the conduit 170 through the conduit 160 and hence into the relief valve 158. Deflate valve 164 is a solenoid controlled, pilot air valve. Such valves are well known in the prior art, as may be seen by reference to U.S. Pat. No. 3,175,581. The pressurized air in conduit 222 may be provided in any convenient manner, such as via a conduit, schematically shown in FIG. 2 by dashed line 223 which communicates air from the source S to conduit 222.

Furthermore, when the poppet element 198 is in the position shown in FIG. 4., pressurized air from space 217 will flow through a very small orifice 214 preferably approximately 0.01 inches in diameter and hole 210 in poppet element 198, providing a small amount of air flow to the control conduits 160 and 170 so as to make up for small amounts of air lost thru leaking fittings and the like. Thus, whenever the solenoid 192 of the deflate valve 164 is energized, pressurized air form conduit 170 is exhausted to atmosphere via the cartridge valve 194, the conduit 160 and the relief valve 158. At the same time, make up air is bled from the space 217 to the conduit 170 via the very small orifice 214 to bypass the deflate valve 164 and make up for any air leakage losses in the CTIS air circuit.

It is of course within the scope of this invention to provide make up air via the solenoid shut off valve 174 so that make up air is bled into the CTIS air circuit at a time other than the deflation mode when the deflate valve 164 is energized and both the shut off valve 174 and the inflate valve 154 are closed as shown in FIG. 2.

Figure 5:
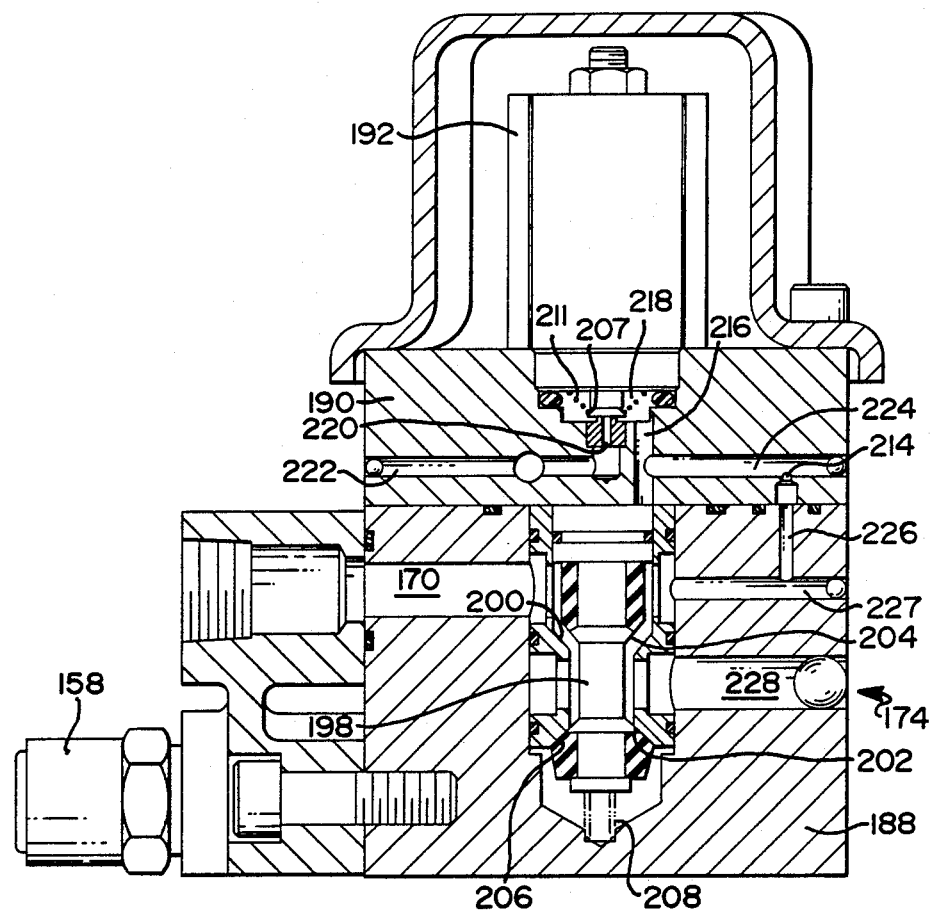
FIG. 5 is a cross-sectional view of the shut-off valve schematically illustrated in FIG. 2.

In FIG. 5, the shut off valve is shown in the steady state or system shut off mode, at which time the shut off valve 174 is spring biased to open position so that conduit 170 is connected to atmosphere. Pressurized air in conduit 170 bypasses the seats 200 and 204 and is vented through the conduit 228 via an unshown opening. The shut off valve 174 is similar in construction and operation to the deflate valve 164, except that the poppet element 198 does not have an orifice 214 and hole 210. Instead the conduit 216 has a branch conduit 224 which is connected to conduit 226 by a very small orifice 214. The conduit 226 is connected to a second branch conduit 227 leading to the conduit 170.

Assuming that the solenoid operator 192 of valve 174 is energized, the valve member 207 is moved away from the seat 220 and air flows into the chamber 218 and conduit 216 forcing the poppet element 198 downwardly. Thus, the seat 206 is opened and the seat 204 is closed and pressurized air from branch conduit 227 is bled into the conduit 170 to make up for small amounts of air lost through leaking fittings and the like. Pilot air is provided to conduit 222 in shut off valve 174 in the same manner described for deflate valve 164. Relief valve 158, which is shown in the background in FIG. 5, continues to be connected to deflate valve 164 via conduit 160.

We claim:

1. A vehicle on board tire inflation and tire deflation air circuit having control means for selectively pressurizing and exhausting a first conduit in an air circuit to inflate a vehicle tire to a preselected higher pressure and to deflate the vehicle tire to a preselected lower pressure comprising;

a relief valve having an outlet port connected to atmosphere, a normally closed solenoid valve for actuating a deflate valve having an inlet port fluidly connected to said first conduit, said deflate valve having an outlet port fluidly connected to an inlet port in said relief valve, said deflate valve effective to establish fluid communication between said first conduit and the inlet port of said relief valve, said relief valve effective to connect the said outlet port thereof to atmosphere when the pressure in said first conduit is greater than a predetermined set pressure of said relief valve and to close said outlet port when the said set pressure is attained, a normally closed solenoid valve for actuating a shut off valve having a port connected to said first conduit, said shut off valve having an outlet port connected to atmosphere, said shut off valve effective to establish fluid communication between said first conduit and atmosphere, one of said solenoid valves effective to bleed pressurized air from said source to said first conduit via a small orifice and passageway means.

2. A vehicle on board tire inflation and tire deflation air circuit as claimed in claim 1 in which said one solenoid valve is the deflate valve, said deflate valve having a poppet element which includes said small orifice and passageway means connecting said orifice to said first conduit.

3. A vehicle on board tire inflation and tire deflation air circuit as claimed in claim 2 in which said orifice and passageway means is effective to bleed said pressurized air only when said solenoid of said deflate valve is energized.

4. A vehicle on board tire inflation and tire deflation air circuit as claimed in claim 1 in which said one solenoid valve is the shut-off valve, said small orifice and passageway means connecting said orifice to said first conduit bypassing a poppet element of said shut-off valve.

5. A vehicle on board tire inflation and tire deflation air circuit as claimed in claim 4 in which said orifice and passageway means is effective to bleed said pressurized air only when said solenoid of said shut-off valve is energized.

* * * * *